United States Patent
Yang et al.

(10) Patent No.: US 10,387,737 B1
(45) Date of Patent: Aug. 20, 2019

(54) RIDER RATING SYSTEMS AND METHODS FOR SHARED AUTONOMOUS VEHICLES

(71) Applicant: GM Global Technology Operations LLC, Detroit, MI (US)

(72) Inventors: Mingyang Yang, Sterling Heights, MI (US); Orhan Demirovic, Sterling Heights, MI (US); Alicia Bidwell, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/887,057

(22) Filed: Feb. 2, 2018

(51) Int. Cl.
    *G06K 9/00* (2006.01)
    *G05D 1/00* (2006.01)
    *G06Q 30/02* (2012.01)
    *G05D 1/02* (2006.01)

(52) U.S. Cl.
    CPC ....... *G06K 9/00832* (2013.01); *G05D 1/0088* (2013.01); *G06Q 30/0282* (2013.01); *G05D 1/0287* (2013.01)

(58) Field of Classification Search
    CPC ............. G06K 9/00832; G05D 1/0088; G05D 1/0287; G06Q 30/0282
    USPC .......................................................... 701/28
    See application file for complete search history.

(56) References Cited

U.S. PATENT DOCUMENTS

2018/0075565 A1* 3/2018 Myers .................. G05D 1/0088

OTHER PUBLICATIONS

U.S. Appl. No. 15/585,764, filed May 3, 2017, Clifford et al.

* cited by examiner

*Primary Examiner* — Marthe Y Marc-Coleman

(57) ABSTRACT

A system for rating a rider of a shared autonomous vehicle (SAV) may include an image reception module, an image comparison module, an object determination module, and a passenger rating module. The image reception module may be configured to obtain first and second images of a cabin of the SAV at different times. The image comparison module may be configured to compare the first image with the second image to provide comparison data. The object determination module may be configured to (i) identify an object in the cabin of the SAV based on the comparison data and (ii) classify the identified object as a particular type of object to provide a classified object. The passenger rating module may be configured to adjust a rider rating associated with the rider based on the classified object.

18 Claims, 8 Drawing Sheets

RIDER RATING SYSTEMS AND METHODS FOR SHARED AUTONOMOUS VEHICLES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for managing shared autonomous vehicles (SAVs) and, more particularly, to systems and methods for rating riders of SAVs.

Rideshare systems allow users to request transportation from a pick-up location to a drop-off location. Rideshare systems may include a fleet of human-operated vehicles (e.g., cars, vans, buses, bicycles, motorcycles, etc.) that are utilized to transport the users from requested pickup locations to requested drop-off locations. The presence of human operators in vehicles utilized as part of a rideshare system may discourage riders from damaging or dirtying the vehicles.

SUMMARY

In a feature, a system for rating a rider of a shared autonomous vehicle (SAV) includes an image reception module, an image comparison module, an object determination module, and a passenger rating module. The image reception module is configured to obtain a first image of a cabin of the SAV prior to the SAV departing on a trip associated with the rider. The image reception module is further configured to obtain a second image of the cabin of the SAV after the SAV has departed on the trip. The image comparison module is configured to compare the first image with the second image to provide comparison data. The object determination module is configured to (i) identify an object in the cabin of the SAV based on the comparison data and (ii) classify the identified object as a particular type of object to provide a classified object. The passenger rating module is configured to adjust a rider rating associated with the rider based on the classified object to provide an adjusted rider rating.

According to another feature, the system further includes a rate adjustment module. The rate adjustment module is configured to adjust a trip rate associated with the rider based on the adjusted rider rating to provide an adjusted trip rate.

In one example of the foregoing feature, the rate adjustment module is configured to adjust the trip rate by performing at least one of the following: initiating the trip rate, maintaining the trip rate, increasing the trip rate, and/or decreasing the trip rate.

In one feature, the passenger rating module is configured to adjust the rider rating by performing at least one of the following: initiating the rider rating, maintaining the rider rating, increasing the rider rating, and/or decreasing the rider rating.

In a feature, the image reception module is configured to obtain the second image of the cabin of the SAV after the SAV has departed on the trip by obtaining the second image after the SAV has reached a destination associated with the trip.

In another feature, the image reception module is configured to obtain the second image of the cabin of the SAV after the SAV has departed on the trip by obtaining the second image prior to the SAV reaching a destination associated with the trip.

In still another feature, the image reception module is configured to obtain the first image of the cabin of the SAV prior to the SAV departing on the trip by obtaining the first image prior to the rider entering the SAV.

In yet another feature, the image reception module is configured to obtain the first image of the cabin of the SAV prior to the SAV departing on the trip by obtaining the first image after the rider has entered the SAV.

In one feature, the image comparison module is configured to compare the first image with the second image by: (i) dividing the first image and the second image into a plurality of regions and (ii) comparing a first region of the first image to a second region of the second image to provide the comparison data. The first region of the first image corresponds to the second region of the second image.

In one example of the foregoing feature, the image comparison module is configured to compare the first region of the first image to the second region of the second image by detecting a change in pixel values between the first region and the second region.

In another example of the foregoing feature, the plurality of regions includes two or more of the following regions of the SAV: a front left seat, a front middle seat, a front right seat, a rear left seat, a rear right seat, a rear middle seat, a front left floor, a front right floor, a rear left floor, a rear right floor, a rear middle floor, a dashboard, a cup holder, a center console, a trunk area, and surface adjacent a rear window.

In one feature, the object determination module is configured to classify the identified object as the particular type of object by comparing an image of the identified object to images of objects stored in a database.

In another feature, the object determination module is configured to classify the identified object as the particular type of object by performing at least one of edge matching, greyscale matching, and gradient matching.

In yet another feature, the system also includes a notification module. The notification module is configured to generate a notification based on the classified object.

In one example of the foregoing feature, the notification module is configured to generate the notification by performing at least one of: (i) flashing one or more lights of the SAV and/or (ii) honking a horn of the SAV.

In another example of the foregoing feature, the system also includes a communications module. The communications module is configured to transmit the generated notification to an electronic device associated with the rider.

In a feature, the system further includes the SAV. In this feature, the SAV includes a camera configured to capture the first and second images and a transceiver configured to transmit the first and second images to the image reception module.

In one feature, a SAV is disclosed. The SAV includes the system described above.

In another feature, a method for rating a rider of a SAV is provided. The method includes (i) obtaining a first image of a cabin of the SAV prior to the SAV departing on a trip associated with the rider; (ii) obtaining a second image of the cabin of the SAV after the SAV has departed on the trip; (iii) comparing the first image with the second image to provide comparison data; (iv) identifying an object in the cabin of the SAV based on the comparison data; (v) classifying the identified object as a particular type of object to provide a classified object; and (vi) adjusting a rider rating associated with the rider based on the classified object to provide an adjusted rider rating.

In one feature, the method further includes adjusting a trip rate associated with the rider based on the adjusted rider rating.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
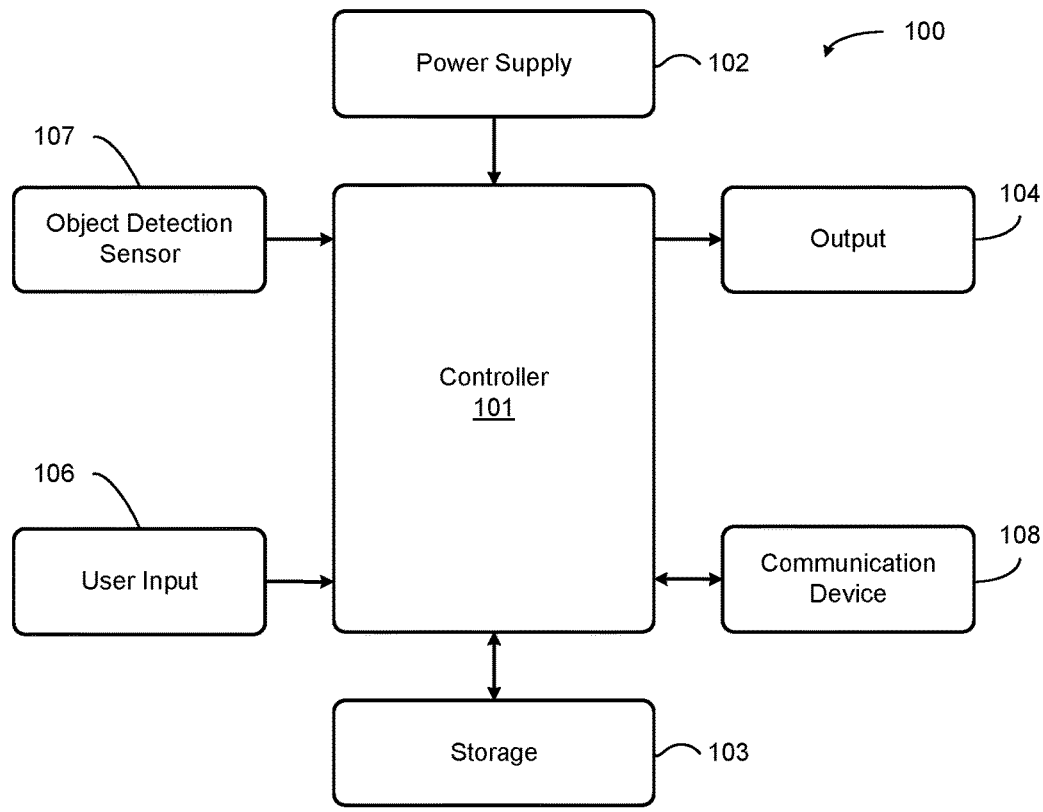
FIG. 1 is a functional block diagram of an apparatus that detects and classifies objects associated with a vehicle according to an exemplary embodiment.

Rideshare users request transportation from a pickup location to a dropoff or destination location. Rideshare riders are generally disinclined to damage the vehicle or leave anything in the vehicle (e.g., trash, personal effects, etc.) due to the presence of a human operator (i.e., driver). Autonomous vehicles (AVs) may also be employed as vehicles within a rideshare system. However, AVs may be susceptible to rider-inflicted damage or litter due to the absence of human operators.

According to the present disclosure, a computing system obtains (i) one or more images of a cabin of a SAV prior to departing on a trip associated with a rider and (ii) one or more images of the cabin of the SAV after the SAV has departed on the trip (e.g., after the SAV has reached the destination associated with the trip). The computing system compares the pre-departure images to the post-departure images to identify the addition of one or more new objects (e.g., trash, one or more rider possessions, damage to a portion of the cabin of the SAV, etc.) into the cabin following the SAV's departure on the trip. The computing system classifies any identified objects as particular types of objects to provide classified objects. The computing system further adjusts a rider rating associated with the rider of the SAV based on any classified objects. In some examples, the computing system utilizes the rider rating to adjust a trip rate associated with a given rider. In other examples, the computing system generates a notification designed to alert a rider to the presence of an object in the cabin of the SAV during or after the trip.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

Throughout the disclosure, one or more of the elements disclosed may be combined into a single device or into one or more devices. In addition, individual elements may be provided on separate devices.

Vehicles (e.g., SAVs) are being equipped with sensors that are capable of detecting conditions of an environment in and around a vehicle. The sensors provide information on conditions that exist in the environment and this information may be used to control the vehicle or to assist an operator of a vehicle. One of the aforementioned sensors, e.g. a camera, may be configured to detect objects, persons, and/or changes in a vehicle. For example, an image taken by a camera may be used by a computing system to identify objects, persons, and/or changes to a vehicle.

One method of identifying changes is to compare images of a vehicle taken at different points in time. However, this method may not be efficient as certain regions of the vehicle are more critical than other regions in detecting objects or persons in a vehicle, or in detecting other features of a vehicle. In one example, an image taken by a camera may be divided into regions and only certain regions identified as relevant to performing object, person, or change identification may be analyzed to identify an object, person, or change in the region. In another example, regions may be ranked and searched based on the ranking to identify an object, person, or change in a region.

FIG. 1 shows a block diagram of an apparatus that detects and classifies objects associated with a vehicle 100, such as a SAV, according to an exemplary embodiment. As shown in FIG. 1, the apparatus that detects and classifies objects associated with a vehicle 100, according to an exemplary embodiment, includes a controller 101, a power supply 102, a storage 103, an output 104, a user input 106, an object detection sensor 107, and a communication device 108. However, the apparatus that detects and classifies objects associated with a vehicle 100 is not limited to the aforementioned configuration and may be configured to include additional elements and/or omit one or more of the aforementioned elements. The apparatus that detects and classifies objects associated with a vehicle 100 may be implemented as part of a vehicle, as a standalone component, as a hybrid between an on vehicle and off vehicle device, or in another computing device.

The controller 101 controls the overall operation and function of the apparatus that detects and classifies objects associated with a vehicle 100. The controller 101 may control one or more of a storage 103, an output 104, a user input 106, an object detection sensor 107, and a communication device 108 of the apparatus that detects and classifies objects associated with a vehicle 100.

The controller 101 is configured to send and/or receive information from one or more of the storage 103, the output 104, the user input 106, the object detection sensor 107, and the communication device 108 of the apparatus that detects and classifies objects associated with a vehicle 100. The information may be sent and received via a bus or network, or may be directly read or written to/from one or more of the storage 103, the output 104, the user input 106, the object detection sensor 107, and the communication device 108 of the apparatus that detects and classifies objects associated with a vehicle 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the controller 101, the storage 103, the output 104, the user input 106, the object detection sensor 107, and the communication device 108, of the apparatus that detects and classifies objects associated with a vehicle 100. The power supply 102 may include one or more from among a battery, an outlet, a capacitor, a solar energy cell, a generator, a wind energy device, an alternator, etc.

The storage 103 is configured for storing information and retrieving information used by the apparatus that detects and classifies objects associated with a vehicle 100. The storage 103 may be controlled by the controller 101 to store and retrieve information received from the controller 101, the object detection sensor 107, and/or the communication device 108. The information may include information on images taken by the object detection sensor 107 and/or a database including classification information on objects or features used to identify objects or features in the images taken by the object detection sensor 107. The storage 103 may also include the computer instructions configured to be executed by a processor to perform the functions of the apparatus that detects and classifies objects associated with a vehicle 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus that detects and classifies objects associated with a vehicle 100. The output 104 may include one or more from among a speaker, an audio device (e.g., a vehicle horn), a display, a centrally-located display, a head up display, a windshield display, a haptic feedback device, a vibration device, a tactile feedback device, a tap-feedback device, a holographic display, an instrument light, an indicator light, one or more headlights, one or more break lights, one or more hazard lights, etc.

The output 104 may output notification including one or more from among an audible notification, a light notification, and a display notification. The notifications may indicate that an object was left in a vehicle, a person is in the vehicle, a change in a feature of the vehicle (e.g., damage to a portion of the vehicle), and/or identification or classification information on a detected object and/or feature.

The user input 106 is configured to provide information and commands to the apparatus that detects and classifies objects associated with a vehicle 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a steering wheel, a touchpad, etc. The user input 106 may be configured to receive a user input to acknowledge or dismiss the notification output by the output 104.

The object detection sensor 107 may include one or more from among a plurality of sensors including a camera, a laser sensor, an ultrasonic sensor, an infrared camera, a LIDAR, a radar sensor, an ultra-short range radar sensor, an ultra-wideband radar sensor, and a microwave sensor. According to one example, the object detection sensor 107 may be one or more cameras disposed in and around the vehicle. For example, a camera may be disposed in one or more of a headliner of the vehicle, a rear view mirror of the vehicle, a side view mirror of the vehicle, a center high mount stop light of a vehicle, a rear view camera of a vehicle, a trunk of a vehicle, under a hood of a vehicle, on top of a vehicle, a dome light of a vehicle, a dashboard of a vehicle, a center console of a vehicle, etc.

The communication device 108 may be used by the apparatus that detects and classifies objects associated with a vehicle 100 to communicate with various types of external apparatuses according to various communication methods. The communication device 108 may be used to send/receive information on images taken by the object detection sensor 107 and/or a database including classification information on objects or features used to identify objects or features in the images taken by the object detection sensor 107. The communication device 108 may also be used to receive information on images taken by the object detection sensor 107 and/or a database including classification information on objects or features used to identify objects or features in the images taken by the object detection sensor 107 to/from the controller 101 of the apparatus that detects and classifies objects associated with a vehicle 100.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

According to an exemplary embodiment, the controller 101 of the apparatus that detects and classifies objects associated with a vehicle 100 is configured to capture a first image and a second image of an area of a vehicle, such as a SAV. For example, the area of the vehicle may be a cabin of the vehicle. The apparatus that detects and classifies objects associated with a vehicle 100 is further configured to divide the first image and the second image into a plurality of regions, compare a first region of the first image to a second region of the second image, the second region of the second image corresponding to the first region in the first image, in response to detecting a difference between the second region and the first region, classify an object present in the difference between the second region and the first region and labeling the classified object, and provide a notification of the classified object to at least one from among an occupant of the vehicle and an operator of the vehicle.

According to an example, the first region corresponds to a location in the vehicle and the second region corresponds to the same location that the first region corresponds to, except that the image of the second region is taken at different point in time than the image of the first region.

According to an example, the controller 101 of the apparatus that detects and classifies objects associated with a vehicle 100 is configured to capture the first image of the area prior to an occupant entering the vehicle. According to another example, the controller 101 of the apparatus that detects and classifies objects associated with a vehicle 100 is configured to capture the second image of the cabin after to the occupant exits the vehicle. For example, a first image may be captured prior to picking up a passenger in ride sharing service and a second image may be captured after the passenger exits the vehicle.

The image may be of an area associated with the occupant or passenger that enters and exits the vehicle. For example, the area of the first and second image may correspond to an area occupied by a passenger that enters/exits a vehicle or may correspond to an area accessed by a passenger such as a trunk, glove box, rear seat. According to another example, an image may be divided up and one or more of the regions corresponding to a passenger or occupant that enters/exits a vehicle or to an area accessed by the passenger or occupant that enters/exits a vehicle such as a trunk, glove box, rear seat.

The regions may include one or more from among a front left seat, a front middle seat, a front right seat, a rear left seat, a rear right seat, a rear middle seat, a front left floor, a front right floor, a rear left floor, a rear right floor, a rear middle floor, a dashboard, a cup holder, a center console, a trunk area, and a surface adjacent a rear window.

The controller 101 of the apparatus that detects and classifies objects associated with a vehicle 100 is further configured to receive an input to re-label the classified object from the operator of the vehicle, and reclassify the object present in the difference between the second region and the first region based on the received input. The operator may receive a classification or identification of an object or feature that is determined by performing object detection on the second image after the difference between the images is detected. The operator may then confirm the classification or identification or revise it as necessary from a remote computer.

The controller 101 of the apparatus that detects and classifies objects associated with a vehicle 100 is also configured to provide the notification of the detected difference by transmitting information on the second image or the classified object to an operator. For example, an operator may be notified of a difference and the operator may view an image of the difference to classify an on object or feature in the difference between the two images. The object or feature may be a forgotten item or damage to the vehicle.

The controller 101 of the apparatus that detects and classifies objects associated with a vehicle 100 is further configured to compare the first region of the first image to the second region of the second image by detecting a change in pixel values in the between the second region and the first region. In addition, the controller 101 of the apparatus that detects and classifies objects associated with a vehicle 100 is configured to classify the object in present in the difference between the second region and the first region by comparing an image of the object to images of objects stored in a database and classifying the object according to a classification of an image stored in the database that is closest to the image of the object.

The controller 101 of the apparatus that detects and classifies objects associated with a vehicle 100 is further configured to train a classifier with information about regions of interest. One or more classifiers may be provided for each divided region such that there are a plurality of classifiers. In addition each classifier may include may be a neural network classifier, a nearest neighbor classifier, a decision tree classifier or a support vector machine classifier.

The controller 101 of the apparatus that detects and classifies objects associated with a vehicle 100 is further configured to classify the object in present in the difference between the second region and the first region by identifying the object by performing at least one from among edge matching, greyscale matching and gradient matching.

Figure 2:
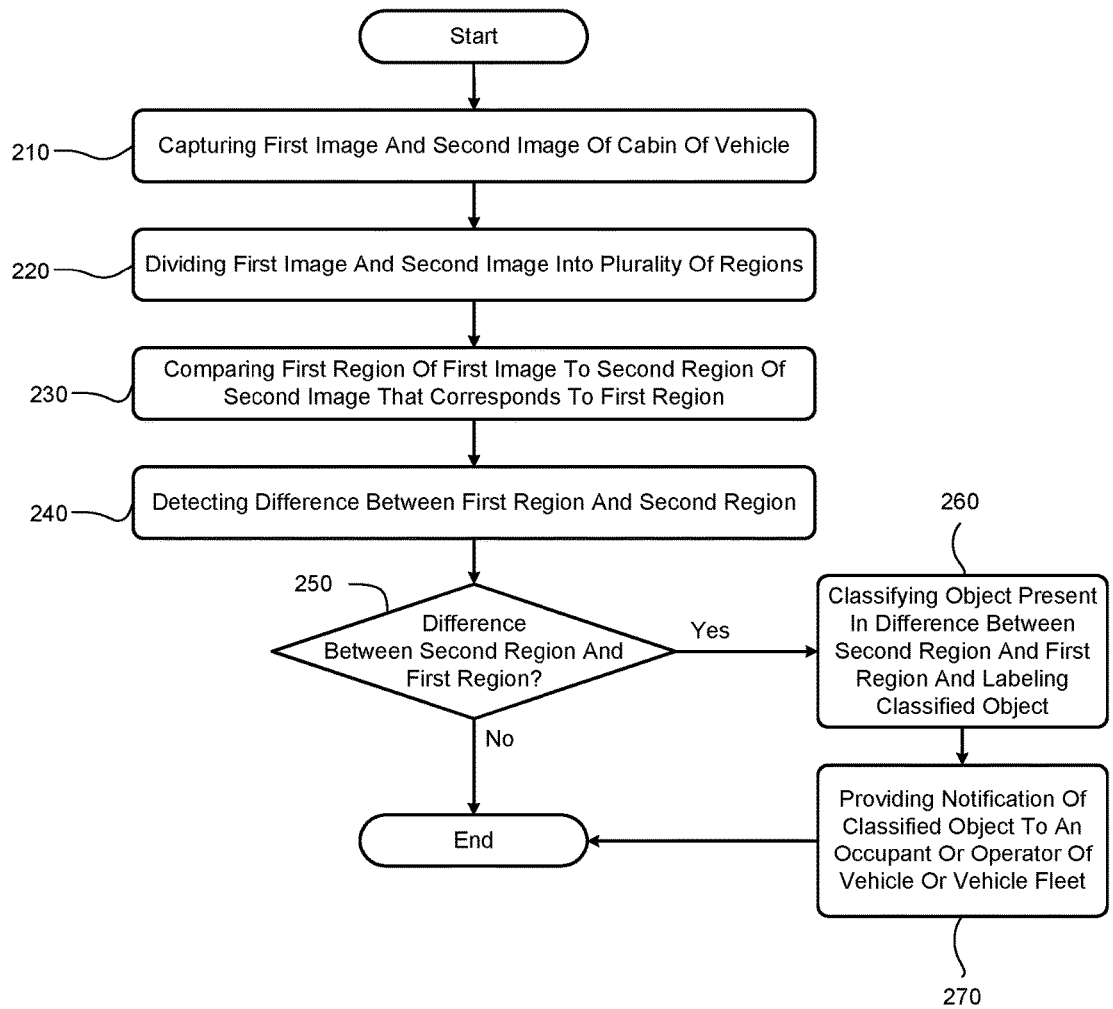
FIG. 2 is a flowchart of a method for detecting and classifying objects associated a vehicle according to an exemplary embodiment.

FIG. 2 shows a flowchart for a method of detecting and classifying objects associated with a vehicle according to an exemplary embodiment. The method of FIG. 2 may be performed by the apparatus that detects and classifies objects associated with a vehicle 100 or may be encoded into a computer readable medium as instructions that are executable by a computer to perform the method.

Referring to FIG. 2, capturing a first image and a second image of an area of a vehicle is performed in operation 210. The first and second image may be images taken by a same camera or of a same area of a vehicle, but that are taken at different points in time. The first and second images are divided into a plurality of regions in operation 220. A first region of the first image and a second region of the second image are compared in operation 230. In this case the first and second regions are the same region of different images or are regions that correspond to each other, but are taken from different images.

In operations 240 and 250, the regions are analyzed to determine whether a difference is detected between the first image and the image. If a difference is detected between the first image and the second image (operation 250—Yes), classifying an object or feature present in the detected difference between the second region and the first region and labeling classified object is performed in operation 260 and then a notification of the classified object or feature is sent to an operator of the vehicle or the fleet in operation 270. Otherwise, if a difference is not present in the corresponding regions of the first and second images (operation 250—No), the process ends.

Figure 3:
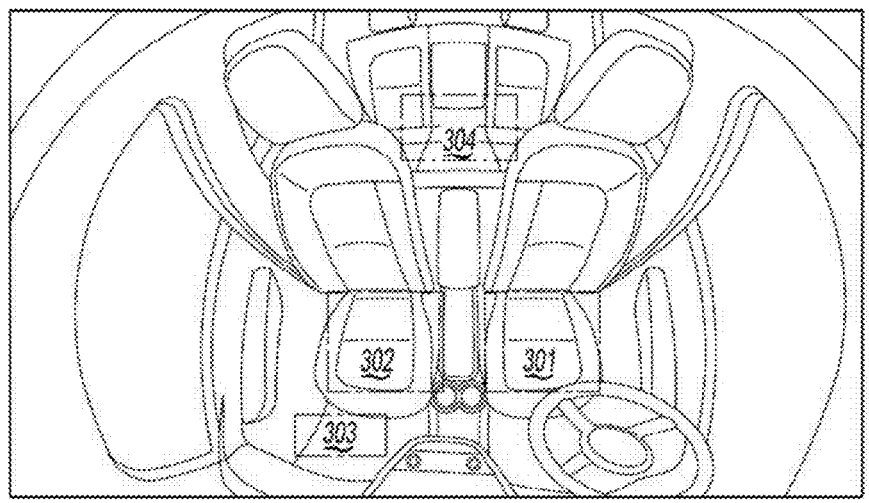
FIG. 3 illustrates dividing an image into regions to perform object detection according to an aspect of an exemplary embodiment.

FIG. 3 shows an illustration of dividing an image into regions to perform object detection according to an aspect of an exemplary embodiment. Referring to FIG. 3, an image 300 taken by a camera in a headliner of a vehicle is shown.

The image is divided up into regions that are recognized as locations where feature or objects of interest may be detected. In this example, a first region 301 is of a front right seat (e.g., a driver's seat), a second region 302 is of a front left seat (e.g., a passenger seat), a third region 303 is of a front left side floor, and fourth region 304 is of the rear seats. The illustration shown in FIG. 3 is merely an example, and images may be divided into other regions of interest.

In another example, images from one or more from among a rear left (e.g., rear passenger) camera, a front left camera, and a middle camera may be divided up into regions. A classifier may be trained for each region and that classifier may be used to identify a difference between a first image (e.g., pre-ride image) and a second image (e.g., a post-ride image) for each region.

Figure 4:
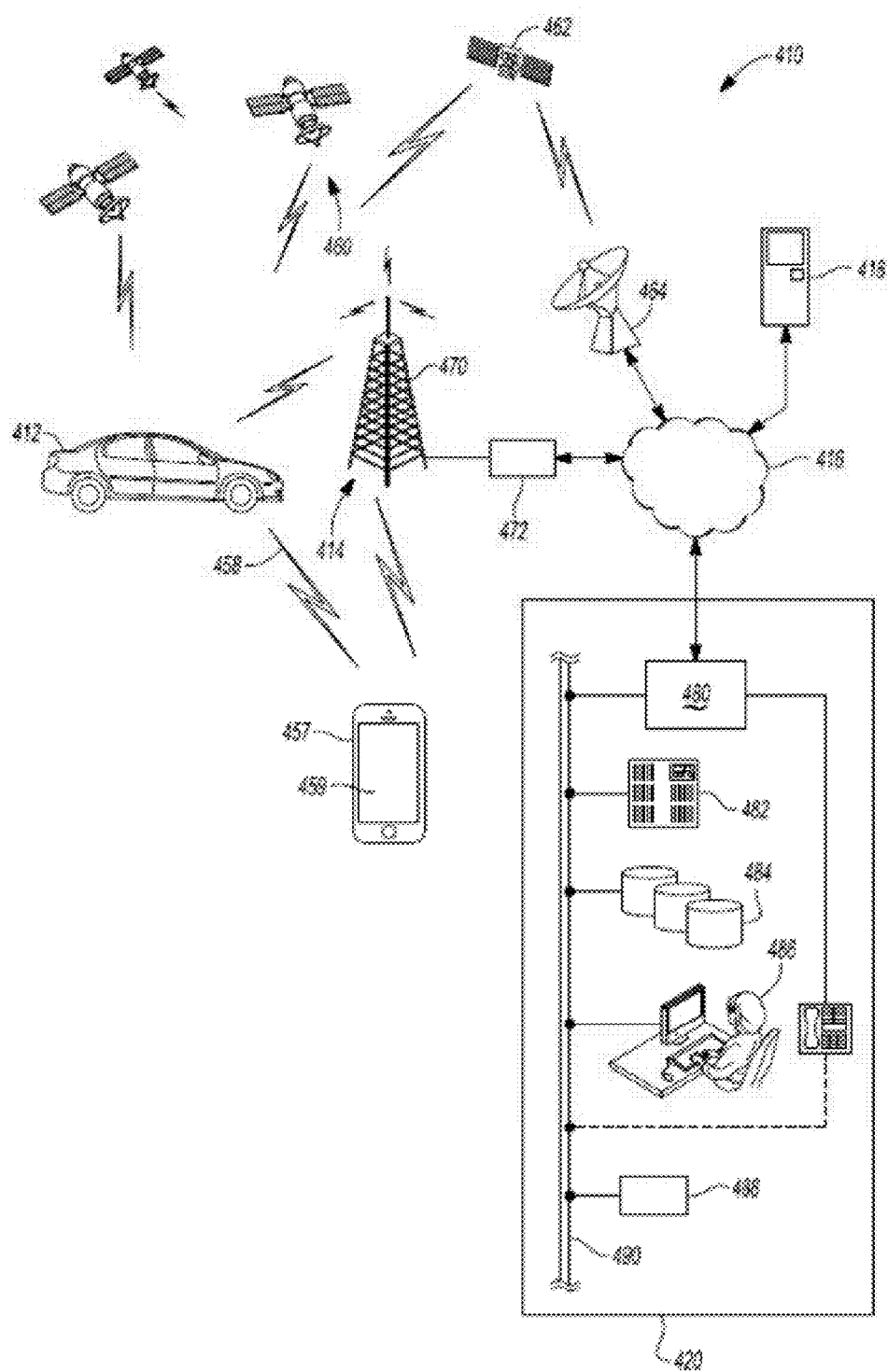
FIG. 4 illustrates a system for providing a notification of a classified object according to an aspect of an exemplary embodiment.

FIG. 4 shows an illustration of an operating environment that comprises a mobile vehicle communications system 410 and that can be used to implement the apparatus and the method for classifying objects in a vehicle cabin.

Referring to FIG. 4, an operating environment that includes a mobile vehicle communications system 410 and that can be used to implement the apparatus and the method for classifying objects in a vehicle cabin is shown. Communications system 410 may include one or more from among a vehicle 412, one or more wireless carrier systems 414, a land communications network 416, a computer 418, and a call center 420. It should be understood that the disclosed apparatus and the method for classifying objects in a vehicle cabin can be used with any number of different systems and is not specifically limited to the operating environment shown here. The following paragraphs simply provide a brief overview of one such communications system 410; however, other systems not shown here could employ the disclosed apparatus and the method for classifying objects in a vehicle cabin as well.

Vehicle 412, which may be a SAV, is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. One or more elements of apparatus for classifying objects in a vehicle cabin 100 shown in FIG. 1 may be incorporated into vehicle 412.

One of the networked devices that can communicate with the communication device 108 is a wireless device, such as a smart phone 457. The smart phone 457 can include computer-processing capability, a transceiver capable of communicating using a short-range wireless protocol 458, and a visual smart phone display 459. In some implementations, the smart phone display 459 also includes a touch-screen graphical user interface and/or a GPS module capable of receiving GPS satellite signals and generating GPS coordinates based on those signals. One or more elements of apparatus for classifying objects in a vehicle cabin 100 shown in FIG. 1 may be incorporated into smart phone 457.

The GPS module of the communication device 108 may receive radio signals from a constellation 460 of GPS satellites, recognize a location of a vehicle based on the on board map details or by a point of interest or a landmark. From these signals, the communication device 108 can determine vehicle position that is used for providing navigation and other position-related services to the vehicle driver. Navigation information can be presented by the output 104 (or other display within the vehicle) or can be presented verbally such as is done when supplying turn-by-turn navigation. The navigation services can be provided using a dedicated in-vehicle navigation module or some or all navigation services can be done via the communication device 108. Position information may be sent to a remote location for purposes of providing the vehicle with navigation maps, map annotations (points of interest, restaurants, etc.), route calculations, and the like. The position information can be supplied to call center 420 or other remote computer system, such as computer 418, for other purposes, such as fleet management. Moreover, new or updated map data can be downloaded by the communication device from the call center 420. In one example, position information may be used by the apparatus for classifying objects in a vehicle cabin 100 shown in FIG. 1 to indicate location of a vehicle in need of repair or that contains a forgotten object.

The vehicle 412 may include vehicle system modules (VSMs) in the form of electronic hardware components that are located throughout the vehicle and typically receive input from one or more sensors and use the sensed input to perform diagnostic, monitoring, control, reporting and/or other functions. Each of the VSMs may be connected by a communications bus to the other VSMs, as well as to the controller 101, and can be programmed to run vehicle system and subsystem diagnostic tests. The controller 101 may be configured to send and receive information from the VSMs and to control VSMs to perform vehicle functions. As examples, one VSM can be an engine control module (ECM) that controls various aspects of engine operation such as fuel ignition and ignition timing, another VSM can be an external sensor module configured to receive information from external sensors such as cameras, radars, LIDARs, and lasers, another VSM can be a powertrain control module that regulates operation of one or more components of the vehicle powertrain, and another VSM can be a body control module that governs various electrical components located throughout the vehicle, like the vehicle's power door locks and headlights. According to an exemplary embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 412, as numerous others are also available.

Wireless carrier system 414 may be a cellular telephone system that includes a plurality of cell towers 470 (only one shown), one or more mobile switching centers (MSCs) 472, as well as any other networking components required to connect wireless carrier system 414 with land network 416. Each cell tower 470 includes sending and receiving antennas and a base station, with the base stations from different cell towers being connected to the MSC 472 either directly or via intermediary equipment such as a base station controller. Cellular system 414 can implement any suitable communications technology, including for example, analog technologies such as AMPS, or the newer digital technologies such as CDMA (e.g., CDMA2000 or 1×EV-DO) or GSM/GPRS (e.g., 4G LTE). As will be appreciated by those skilled in the art, various cell tower/base station/MSC arrangements are possible and could be used with wireless system 414. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 414, a different wireless carrier system in the form of satellite communication can be used to provide uni-directional or bi-directional communication with the vehicle. This can be done using one or more communication satellites 462 and an uplink transmitting station 464. Uni-directional communication can be, for example, satellite radio services, wherein programming content (news, music, etc.) is received by transmitting station 464, packaged for upload, and then sent to the satellite 462, which broadcasts the programming to subscribers. Bi-directional communication can be, for example, satellite telephony services using satellite 462 to relay telephone communications between the vehicle 412 and station 464. If used, this satellite telephony can be utilized either in addition to or in lieu of wireless carrier system 414.

Land network 416 may be a land-based telecommunications network that is connected to one or more landline telephones and connects wireless carrier system 414 to call center 420. For example, land network 416 may include a public switched telephone network (PSTN) such as that used to provide hardwired telephony, packet-switched data communications, and the Internet infrastructure. One or more segments of land network 416 could be implemented with a standard wired network, a fiber or other optical network, a cable network, power lines, other wireless networks such as wireless local area networks (WLANs), or networks providing broadband wireless access (BWA), or any combination thereof. According to an example, call center 420 may not be connected via land network 416, but may include wireless telephony equipment so that it can communicate directly with a wireless network, such as wireless carrier system 414.

Computer 418 can be one of a number of computers accessible via a private or public network such as the Internet. Each such computer 418 can be used for one or more purposes, such as a web server accessible by the vehicle via the communication device 108 and wireless carrier 414. Other such accessible computers 418 can be, for example: a service center computer where diagnostic information and other vehicle data can be uploaded from the vehicle via the communication device 108; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 412 or call center 420, or both. A computer 418 can also be used for providing Internet connectivity such as DNS services or as a network address server that uses DHCP or other suitable protocol to assign an IP address to the vehicle 412.

Call center 420 is designed to provide the vehicle electronics with a number of different system back-end functions and, according to the exemplary embodiment shown here, generally includes one or more switches 480, servers 482, databases 484, live advisors 486, as well as an automated voice response system (VRS) 488. These various call center components may be coupled to one another via a wired or wireless local area network 490. Switch 480, which can be a private branch exchange (PBX) switch, routes incoming signals so that voice transmissions are usually sent to either the live adviser 486 by regular phone or to the automated voice response system 488 using VoIP. The live advisor phone can also use VoIP as indicated by the broken line in FIG. 4. VoIP and other data communication through the switch 480 is implemented via a modem (not shown) connected between the switch 480 and network 490. Data transmissions are passed via the modem to server 482 and/or database 484. Database 484 can store account information such as subscriber authentication information, vehicle identifiers, profile records, behavioral patterns, information on images taken by the object detection sensor 107, a database including classification information on objects or features used to identify objects or features in the images taken by the object detection sensor 107, information on recognized objects or features and a corresponding vehicle and vehicle location, and other pertinent subscriber information. Data transmissions may also be conducted by wireless systems, such as 802.11x, GPRS, and the like. Although the illustrated embodiment has been described as it would be used in conjunction with a manned call center 420 using live advisor 486, it will be appreciated that the call center can instead utilize VRS 488 as an automated advisor or, a combination of VRS 488 and the live advisor 486 can be used. The information in the database may be used by a live advisor or server to provide notifications about detected objects, features, damage to the aforementioned vehicles or smartphones via the aforementioned networks.

According to one example, the live advisor 486 may receive a classification information regarding a classification of a region of the plurality of regions and an image of the region. The live advisor 486 may confirm or change the classification information after viewing the image of the region. In another example, the live advisor 486 may receive the classification information and the image if a confidence score of the classification of the region is below a predetermined threshold confidence score. Thus, the live advisor 486 may correct the classification information when necessary.

Figure 5:
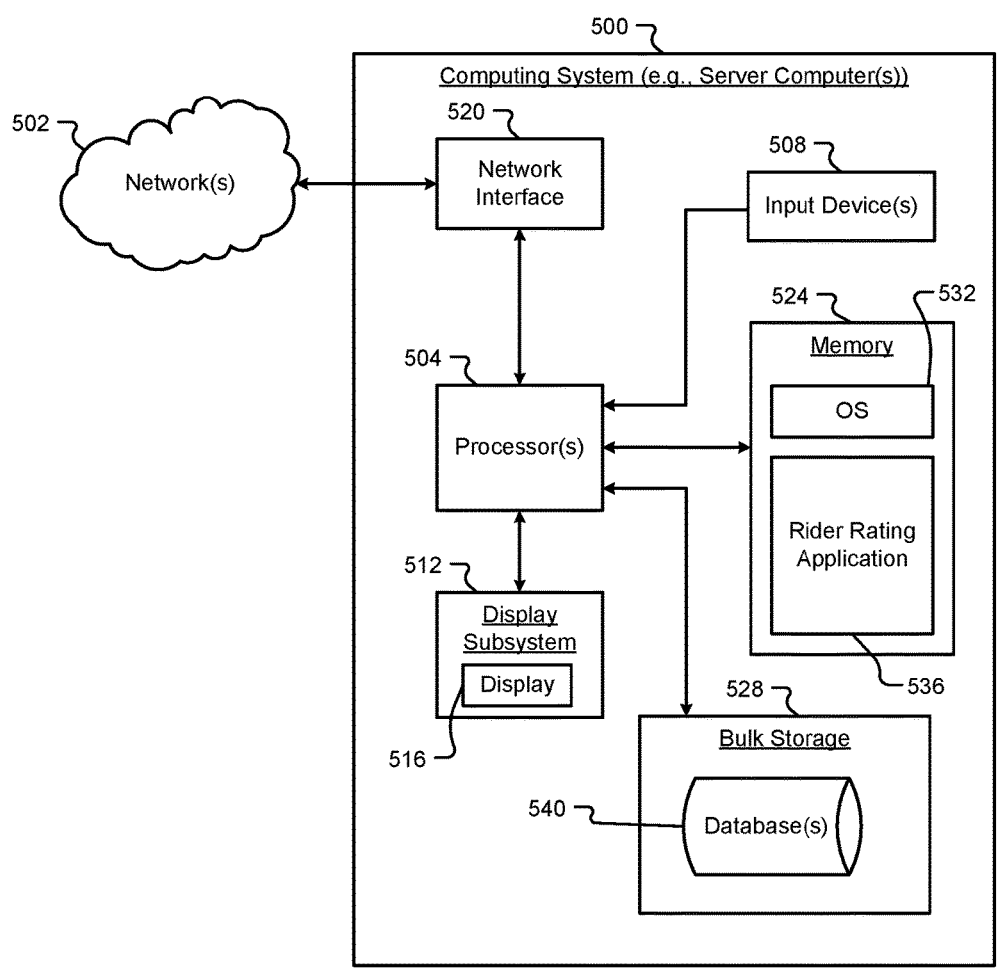
FIG. 5 is a functional block diagram of a computing system for rating a rider of a SAV according to an exemplary embodiment.

Referring now to FIG. 5, a simplified functional block diagram of an example computing system 500 configured to rate a rider of a SAV is provided. According to one example, the computing system 500 may be implemented as one or more server computers or the like located remotely from the SAV. According to another example, the computing system may be implemented locally within a SAV (e.g., through suitable hardware, software, and/or firmware). According to yet another example, functions for performing object identification/classification and rider rating may be shared between hardware, software, and/or firmware located within the SAV, and hardware, software, and/or firmware located remotely from the SAV.

The computing system 500 includes one or more processors 504, one or more input devices 508 (e.g., a keyboard, touchpad, mouse, etc.), a display subsystem 512 including a display 516, a network interface 520, a memory 524, and a bulk storage 528. While the input devices 508 and the display 516 are illustrated as components of the computing system 500, input devices and output devices (e.g., a display) may be peripheral devices.

The network interface 520 connects computing system 500 to one or more SAVs (e.g., vehicle 412 shown in FIG. 4) and one or more electronic devices associated with respective riders (e.g., smart phone 457 shown in FIG. 4) via the network(s) 502. For example, the network interface 520 may include a wired interface (e.g., an Ethernet interface) and/or a wireless interface (e.g., a Wi-Fi, Bluetooth, near field communication (NFC), or other wireless interface). The memory 524 may include volatile or nonvolatile memory, cache, or other type of memory. The bulk storage 528 may include flash memory, one or more hard disk drives (HDDs), or other bulk storage device.

The processor(s) 504 execute an operating system (OS) 532 and one or more server applications, such as a rider rating application 536. The bulk storage 528 may store one or more databases 540 that store data structures used by the server applications to perform functions described herein. The processor 504 executes the rider rating application 536 to perform object identification, object classification, rider rating adjustment, trip rate adjustment, notification generation, etc. Operations discussed herein as being performed by the computing system 500 are performed by the computing system 500 (more specifically the processor(s) 504) during execution of the rider rating application 536. While functions described herein as being performed by the computing system 500, functionality of the computing system 500 may distributed amongst two or more servers.

Figure 6:
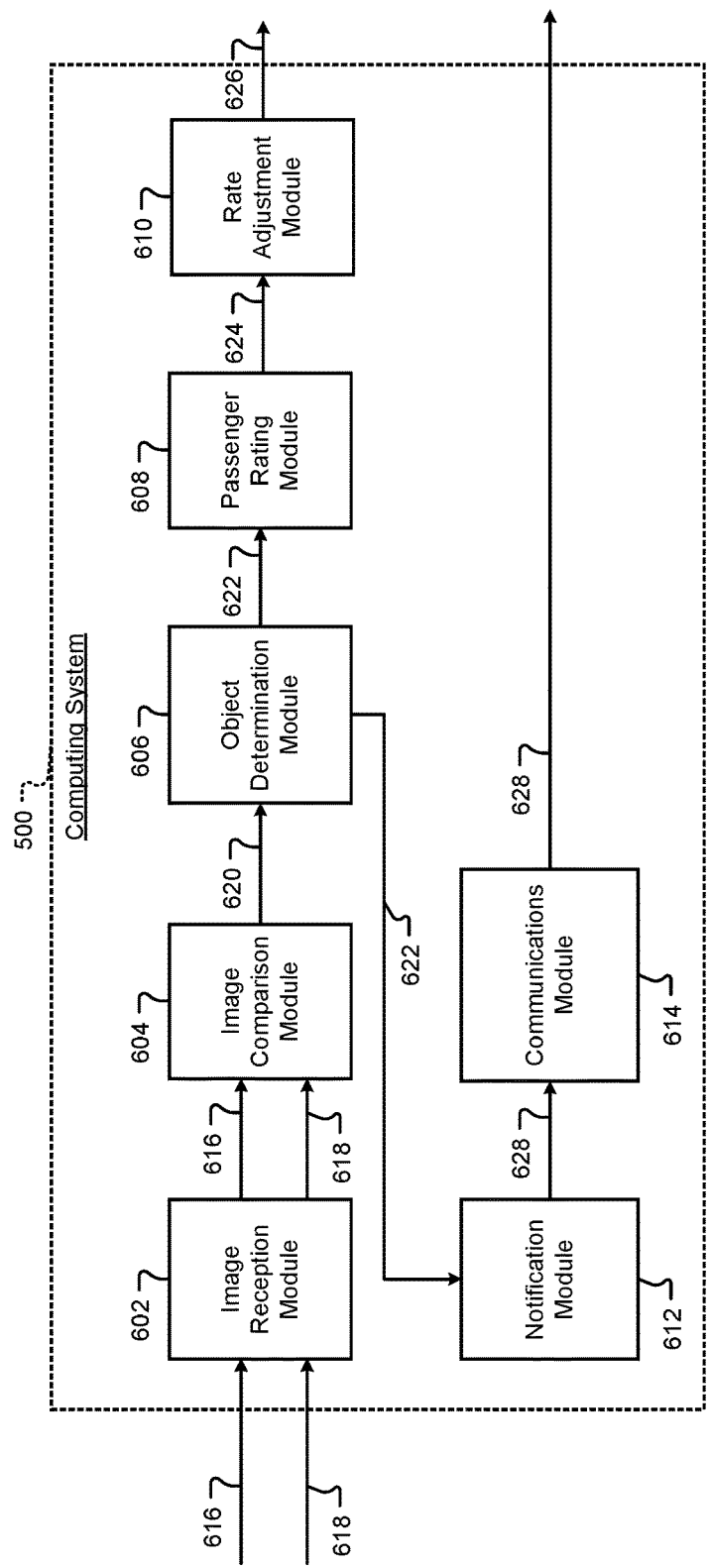
FIG. 6 is another functional block diagram of a computing system for rating a rider of a SAV according to an exemplary embodiment.

FIG. 6 is a functional block diagram illustrating an example implementation of the computing system 500. The computing system 500 includes an image reception module 602, an image comparison module 604, an object determination module 606, a passenger rating module 608, a rate adjustment module 610, a notification module 612, and a communications module 614.

In operation, the computing system 500 may operate as follows to perform object identification and classification, rider rating, and/or trip rate adjustment. The image reception module 602 is configured to obtain a first image 616 and a second image 618. The first and second images 616, 618 may be obtained by the image reception module 602 from one or more suitable image capture sources including, but not limited to, an object detection sensor (e.g., object detection sensor 107 described above) or the like. The first and second images 616, 618 may include digital images or the like composed of a plurality of pixels, each pixel having one or more pixel values.

The first image 616 may depict a cabin of a SAV prior to the SAV departing on a trip associated with a rider. As used herein, a trip associated with a rider may include a trip scheduled by a rider through, for example, an electronic device (e.g., a smartphone) associated with the rider. According to one example, the first image 616 may be obtained by the image reception module 602 prior to the rider entering the SAV. According to another example, the first image 616 may be obtained by the image reception module 602 after the rider has entered the SAV. Generally, the first image 616 will be obtained by the image reception module 602 prior to the SAV departing on the trip associated with the rider so as to, for example, reflect the state and/or condition of the SAV prior to the trip.

The second image 618 may depict an image of the cabin of the SAV after the SAV has departed on the trip associated with the rider. According to one example, the second image 618 may be obtained by the image reception module 602 after the SAV has reached a destination associated with the trip (i.e., the "drop off" location). According to another example, the second image 618 may be obtained by the image reception module 602 prior to the SAV reaching the destination associated with the trip (i.e., while the trip is still in progress).

While the computing system 500 is generally directed to assessing the state of the SAV cabin at the conclusion of a rider's trip (e.g., with regard to any items left within the SAV and/or any damage done to the SAV), according to some examples, it may be useful to assess the state of the cabin during a rider's trip (i.e., prior to the SAV reaching the destination and the rider exiting the SAV). For example, according to some implementations, the second image 618 is obtained by the image reception module 602 prior to the SAV reaching a destination associated with the trip (e.g., in "real time"). This may be useful to detect rider behavior and/or actions occurring during the trip that may no longer be visually perceptible at the conclusion of the trip, such as evidence of smoking. For example, by obtaining the second image 618 while a rider's trip is in progress, objects such as plumes of smoke may be identified (e.g., from a cigarette or cigar or the like) and/or classified to indicate that a rider smoked while in the SAV. This may be used to adjust a rider rating or the like, as discussed further below (e.g., in a situation in which smoking is prohibited with the SAV).

Figure 7:
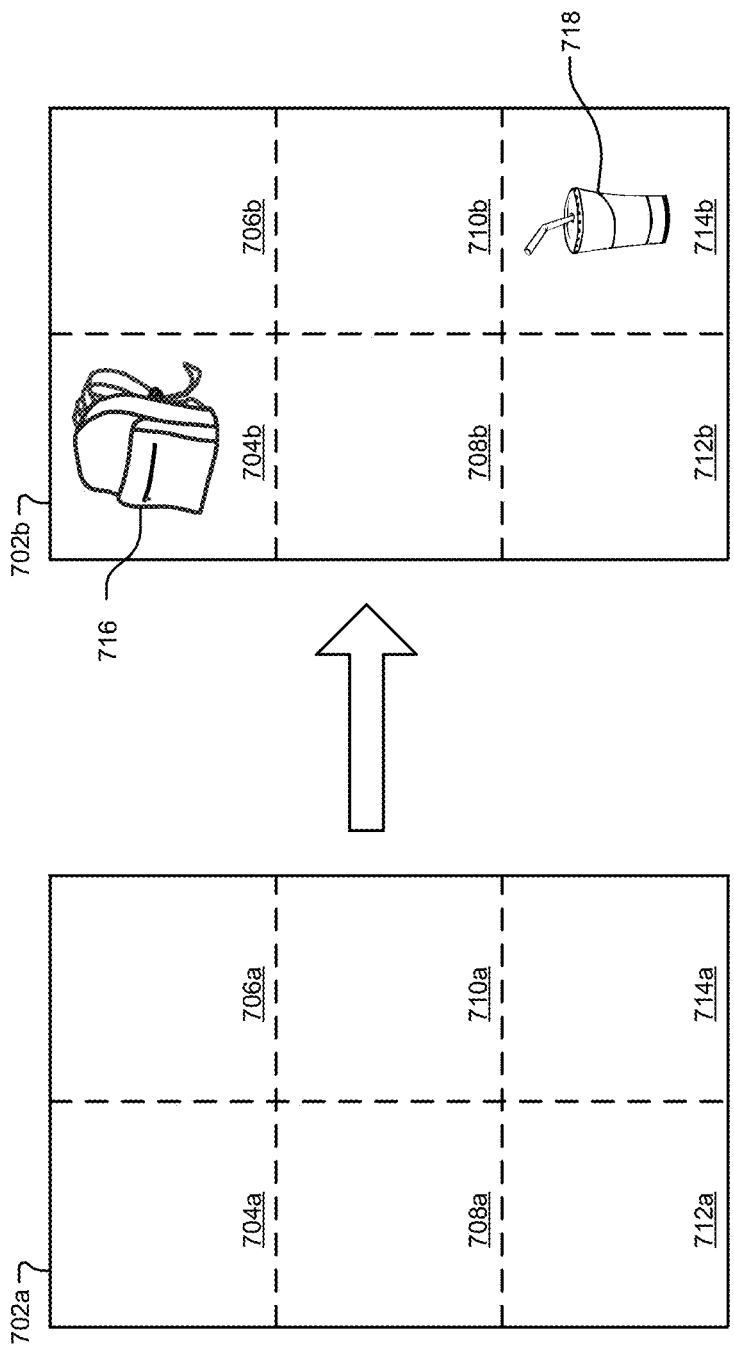
FIG. 7 illustrates dividing images into regions and comparing corresponding regions according to an exemplary embodiment.

The image comparison module 604 is configured to compare the first image 616 with the second image 618 to provide comparison data 620. According to one example, the image comparison module 604 compares the first image 616 with the second image 618 by (i) dividing the first image and the second image into a plurality of regions and (ii) comparing a first region of the first image 616 to a second region of the second image 618 to provide the comparison data 620. According to this example, the first region of the first image 616 corresponds to the second region of the second image 618, as discussed in further detail above with regard to, for example, FIGS. 2-3. FIG. 7, discussed in additional detail below, illustrates one example of the manner in which corresponding regions of the first and second images 616, 618 may be compared.

In one example, the image comparison module 604 compares the first region of the first image 616 to the second region of the second image 618 by detecting a change in pixel values between the first region and the second region. Pixel values may be expressed using any suitable pixel value conventions known in the art.

According to another example, the plurality of regions may be associated with regions of the SAV including, but not limited to: a front left seat, a front middle seat, a front right seat, a rear left seat, a rear right seat, a rear middle seat, a front left floor, a front right floor, a rear left floor, a rear right floor, a rear middle floor, a dashboard, a cup holder, a center console, a trunk area, and surface adjacent a rear window.

The object determination module 606 is configured to identify an object in the cabin of the SAV based on the comparison data 620. As noted above, an "object" in the context of the present disclosure may include, but is not limited to: (i) a solid article, such as a piece of paper, a handbag, a jacket, a cigarette butt, etc.; (ii) a non-solid article, such as a plume of smoke, water, etc.; and/or (iii) damage to a portion of the cabin of the SAV (e.g., a tear or burn hole in the seating fabric).

The object determination module 606 is further configured to classify the identified object as a particular type of object to provide a classified object 622. According to one example, the object determination module 606 is configured to classify the identified object by comparing an image of the identified object to images of objects stored in a database (e.g., the database(s) 540 discussed above with regard to FIG. 5). According to another example, the object determination module 606 is configured to classify the identified object by performing at least one of edge matching, greyscale matching, and/or gradient matching. Furthermore, according to some examples, classifying an object may include labeling the object as a particular type of object (e.g., as a "wallet"). Object classification, as described herein, may further be performed, according to some examples, using supervised machine learning or any other suitable classification technique known in the art.

The passenger rating module 608 is configured to adjust a rider rating associated with the rider based on the classified object 622 to provide an adjusted rider rating 624. The adjusted rider rating 624 may reflect the rider's adherence to SAV-treatment guidelines, such as, but not limited to: do not leave any personal items in the SAV, do not damage the SAV, do not smoke in the SAV, etc. The adjusted rider rating 624 may be expressed according to any suitable rating convention including, but not limited to, a star-based rating (e.g., a scale of 1 to 5 stars), a numerical rating (e.g., a scale of 1 to 10), a textual rating (e.g., poor, fair, good, excellent), etc.

According to one example, the passenger rating module 608 is configured to adjust the rider rating by performing at least one of the following: (i) initiating the rider rating (e.g., setting an initial rider rating, for example, before or after a rider's first trip using the SAV-based rideshare system disclosed herein); (ii) maintaining the rider rating (e.g., keeping the rider rating the same as a previously established rider rating); (iii) increasing the rider rating (e.g., improving the rider rating to reflect adherence to the SAV-treatment guidelines); and/or (iv) decreasing the rider rating (e.g., negatively affecting the rider rating to reflect lack of adherence to the SAV-treatment guidelines).

Furthermore, according to some examples, the type of the classified object influences the rider rating. For example, classifying the identified object as a wallet may not negatively influence a rider's rating because it is unlikely that the rider left their wallet in the SAV on purpose. Conversely, classifying the identified object as a beverage cup may negatively influence a rider's rating because a beverage cup may be considered refuse.

The rate adjustment module 610 is configured to adjust a trip rate associated with the rider based on the adjusted rider rating 624 to provide an adjusted trip rate 626. According to one example, the adjusted trip rate 626 may reflect a price associated with use of the SAV-based rideshare system by a particular rider. The adjusted trip rate 626 may be expressed, for example, in terms of cost per distance traveled, cost per time of travel, cost per some combination of distance and time, or any other suitable trip rate convention known in the art. According to one example, the rate adjustment module 610 is configured to adjust the trip rate by performing at least one of the following: (i) initiating the trip rate (e.g., setting an initial trip rate, for example, before a rider's first trip using the SAV-based rideshare system disclosed herein); (ii) maintaining the trip rate (e.g., keeping the trip rate the same as a previously established trip rate); (iii) increasing the trip rate (e.g., increasing the cost of a trip to reflect lack of adherence to the SAV-treatment guidelines); and/or (iv) decreasing the trip rate (e.g., decreasing the cost of a trip to reflect adherence to the SAV-treatment guidelines).

According to some examples, the adjusted rider rating 624 and/or adjusted trip rate 626 may be stored (e.g., in a database or the like, such as database(s) 540) as part of a rider profile. In this manner, each rider making use of the rideshare system described herein may be associated with a customized rider rating and/or trip rate based, for example, on that rider's prior conduct utilizing the rideshare system. This may encourage riders to adhere to the SAV-treatment guidelines, thereby improving (i) the experience of all riders in the system and (ii) the useful lifetime of each SAV in the fleet of SAVs utilized as part of the system.

The notification module 612 is configured to generate a notification 628 based on the classified object 622. According to one example, the notification module 612 is configured to generate the notification 628 by (i) flashing one or more lights of the SAV and/or (ii) honking a horn of the SAV. For example, the notification module 612 is configured to issue a command or signal to the lights of the SAV and/or the horn of the SAV. The flashing lights and/or honking horn may serve to notify a rider of the SAV that, for example, an object (e.g., a wallet) has been left in the SAV. In other examples, the generated notification 628 includes data describing an object left in a SAV following completion of a trip.

The communication module 614 is configured to transmit the generated notification 628 to an electronic device associated with the rider (e.g., a rider's smartphone). In this manner, a rider may be notified, for example, that they left an object in the SAV following completion of a trip.

Referring now to FIG. 7, one example of dividing images into regions and comparing corresponding regions is shown. In the example of FIG. 7, a first image 702a has been divided into a plurality of regions 704a, 706a, 708a, 710a, 712a, and 714a. According to this example, the first image 702a reflects a cabin of a SAV prior to the SAV departing on a trip associated with a rider (permanent features of the cabin, such as seats, flooring, etc. have been omitted from FIG. 7 for purposes of simplicity).

Similarly, a second image 702b has also been divided into a plurality of regions 704b, 706b, 708b, 710b, 712b, and 714b. According to this example, the second image 702b reflects the cabin of the SAV after the SAV has departed on the trip (again, permanent features of the cabin, such as seats, flooring, etc. have been omitted from FIG. 7 for purposes of simplicity).

According to one example, the system for rating a rider described herein (e.g., as implemented by the computing system 500) is configured to compare the first image 702a with the second image 702b. More specifically, the system of the present disclosure is configured to (i) divide the first image 702a and the second image 702b into a plurality of regions and (ii) compare a first region of the first image 702a to a second region of the second image 702b, where the first region of the first image 702a corresponds to the second region of the second image 702b.

For example, region 704a of the first image 702a may correspond to region 704b of the second image 702b. In comparing the region 704a to region 704b, the system may identify an object 716 in the cabin of the SAV. In this manner, the system may determine, for example, that the rider has left an item in the SAV. As discussed above, the system may respond to such a determination by generating a notification to alert the rider to the presence of the object in the SAV. The notification may take the form of flashing the SAV's lights, honking the SAV's horn, transmitting a digital message to the rider's electronic device, etc.

In addition, according to some examples, the system is configured to classify the identified object 716 as a particular type of object. For example, in addition to simply identifying the presence of the object 716 in region 704b of the second image 702b, the system may additionally classify the identified object, in this case, as a backpack. This may be accomplished, according to some examples, by comparing the second image 702b (and, in some instances, the pertinent region 704b of the second image 702b) to images of objects stored in a database (e.g., database(s) 540 discussed above). Such a comparison includes, in some examples, comparing pixel values associated with the object 716 to pixel values associated with images stored in the database. According to some examples, and as discussed above, object classification includes performing edge matching, greyscale matching, and/or gradient matching.

According to some implementations, multiple objects are identified in the difference between the first image 702a and the second image 702b. For example, in addition to identifying (and/or classifying) object 716 based on a comparison of region 704a and 704b, the system also identifies (and/or classifies) another object 718 based on a comparison of region 714a of the first image 702a and region 714b of the second image 702b. As with the identification of the object 716 discussed above, the system may generate a notification to alert a rider to the presence of object 718. In some examples, a single notification may alert the driver to the presence of both objects 716, 718. In another example, notifications may be generated on a per-object basis.

Figure 8:
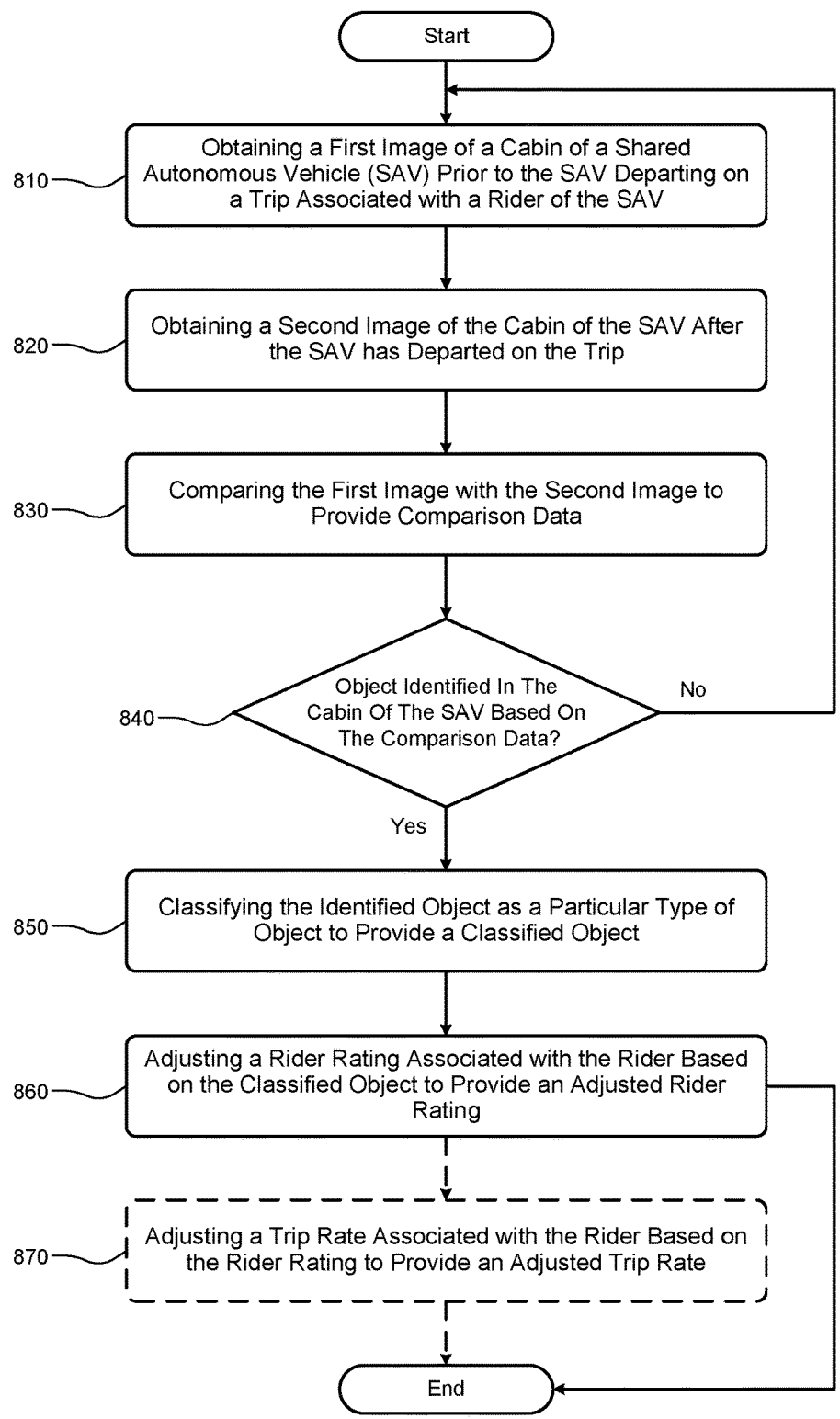
FIG. 8 is a flowchart of a method for rating a rider of a SAV according to an exemplary embodiment.

FIG. 8 is a flowchart depicting an example method for rating a rider of a SAV. The method begins at 810 where a first image of a cabin of a SAV is obtained prior to the SAV departing on a trip associated with a rider of the SAV. At 820, a second image of the cabin of the SAV is obtained after the SAV has departed on the trip. At 830, the first image is compared with the second image to provide comparison data.

At 840, a determination is made as to whether an object was identified in the cabin of the SAV based on the comparison data. If no object was identified, the method may return to 810. If, however, an object is identified, the method may proceed to 850 where the identified object may be classified as a particular type of object to provide a classified object. At 860, a rider rating associated with the rider may be adjusted based on the classified object to provide an adjusted rider rating. In some examples, following 860, the method may conclude. However, in some examples, the method may proceed to 870 where a trip rate associated with the rider may be adjusted based on the rider rating to provide an adjusted trip rate.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system for rating a rider of a shared autonomous vehicle (SAV), the system comprising:
   a processor; and
   a non-transitory computer readable medium including instructions executed by the processor for:
      obtaining, using a camera, a first image of a cabin of the SAV prior to the SAV departing on a trip associated with the rider;
      obtaining, using the camera, a second image of the cabin of the SAV after the SAV has departed on the trip;
      comparing the first image with the second image to provide comparison data;
      identifying an object in the cabin of the SAV based on the comparison data;
      classifying the identified object as a particular type of object to provide a classified object by comparing an image of the identified object to images of objects stored in a database; and
      adjusting a rider rating associated with the rider based on the classified object to provide an adjusted rider rating.

2. The system of claim 1, wherein the instructions further include instructions for:
   adjusting a trip rate associated with the rider based on the adjusted rider rating to provide an adjusted trip rate.

3. The system of claim 2, wherein the instructions for adjusting the trip rate include instructions for adjusting the trip rate by performing at least one of:
   initiating the trip rate;
   maintaining the trip rate;
   increasing the trip rate; and
   decreasing the trip rate.

4. The system of claim 1, wherein the instructions for adjusting the rider rating include instructions for adjusting the rider rating by performing at least one of:
   initiating the rider rating;
   maintaining the rider rating;
   increasing the rider rating; and
   decreasing the rider rating.

5. The system of claim 1, wherein the instructions for obtaining the second image include instructions for obtaining the second image of the cabin of the SAV after the SAV has departed on the trip by obtaining the second image after the SAV has reached a destination associated with the trip.

6. The system of claim 1, wherein the instructions for obtaining the second image include instructions for obtaining the second image of the cabin of the SAV after the SAV has departed on the trip by obtaining the second image prior to the SAV reaching a destination associated with the trip.

7. The system of claim 1, wherein the instructions for obtaining the first image include instructions for obtaining the first image of the cabin of the SAV prior to the SAV departing on the trip by obtaining the first image prior to the rider entering the SAV.

8. The system of claim 1, wherein the instructions for obtaining the first image include instructions for obtaining the first image of the cabin of the SAV prior to the SAV departing on the trip by obtaining the first image after the rider has entered the SAV.

9. The system of claim 1, wherein the instructions for comparing the first image with the second image include instructions for comparing the first image with the second image by:
   dividing the first image and the second image into a plurality of regions; and
   comparing a first region of the first image to a second region of the second image to provide the comparison data, wherein the first region of the first image corresponds to the second region of the second image.

10. The system of claim 9, wherein the instructions for comparing the first region to the second region include instructions for comparing the first region of the first image to the second region of the second image by detecting a change in pixel values between the first region and the second region.

11. The system of claim 9, wherein the plurality of regions comprise two or more of the following regions of the SAV: a front left seat, a front middle seat, a front right seat, a rear left seat, a rear right seat, a rear middle seat, a front left floor, a front right floor, a rear left floor, a rear right floor, a rear middle floor, a dashboard, a cup holder, a center console, a trunk area, and surface adjacent a rear window.

12. The system of claim 1, wherein the instructions further include instructions for:
   generating a notification based on the classified object.

13. The system of claim 12, wherein the instructions for generating the notification include instructions for generating the notification by performing at least one of:
   flashing one or more lights of the SAV; and
   honking a horn of the SAV.

14. The system of claim 12, wherein the instructions include instructions for:

transmitting the generated notification to an electronic device associated with the rider.

15. A shared autonomous vehicle (SAV) comprising: the system of claim 1.

16. A system for rating a rider of a shared autonomous vehicle (SAV), the system comprising:
- a processor; and
- a non-transitory computer readable medium including instructions executed by the processor for:
  - obtaining, using a camera, a first image of a cabin of the SAV prior to the SAV departing on a trip associated with the rider;
  - obtaining, using the camera, a second image of the cabin of the SAV after the SAV has departed on the trip;
  - comparing the first image with the second image to provide comparison data;
  - identifying an object in the cabin of the SAV based on the comparison data:
  - classifying the identified object as a particular type of object to provide a classified object by performing at least one of edge matching, greyscale matching, and gradient matching; and
  - adjusting a rider rating associated with the rider based on the classified object to provide an adjusted rider rating.

17. A method for rating a rider of a shared autonomous vehicle (SAV), the method comprising:
- obtaining, by a camera, a first image of a cabin of the SAV prior to the SAV departing on a trip associated with the rider;
- obtaining, by the camera, a second image of the cabin of the SAV after the SAV has departed on the trip;
- comparing, by a processor, the first image with the second image to provide comparison data;
- identifying, by the processor, an object in the cabin of the SAV based on the comparison data;
- classifying, by the processor, the identified object as a particular type of object to provide a classified object by one of:
  - comparing an image of the identified object to images of objects stored in a database; and
  - performing at least one of edge matching, greyscale matching, and gradient matching; and
- adjusting, by the processor, a rider rating associated with the rider based on the classified object to provide an adjusted rider rating.

18. The method of claim 17, further comprising:
- adjusting, by the processor, a trip rate associated with the rider based on the adjusted rider rating.

* * * * *